(12) United States Patent
Forsyth

(10) Patent No.: US 12,104,695 B2
(45) Date of Patent: Oct. 1, 2024

(54) CVT PRIMARY CLUTCH FOR OFF-ROAD VEHICLES

(71) Applicant: TAPP MFG, INC., Sicamous (CA)

(72) Inventor: David Randolph Forsyth, Sicamous (CA)

(*) Notice: Subject to any disclaimer, the term of this patent is extended or adjusted under 35 U.S.C. 154(b) by 0 days.

(21) Appl. No.: 18/280,069

(22) PCT Filed: Jul. 20, 2021

(86) PCT No.: PCT/IB2021/000510
§ 371 (c)(1),
(2) Date: Sep. 1, 2023

(87) PCT Pub. No.: WO2022/189825
PCT Pub. Date: Sep. 15, 2022

(65) Prior Publication Data
US 2024/0151295 A1    May 9, 2024

Related U.S. Application Data

(60) Provisional application No. 63/158,307, filed on Mar. 8, 2021.

(51) Int. Cl.
*F16H 9/12* (2006.01)
*F16H 57/04* (2010.01)

(52) U.S. Cl.
CPC ......... *F16H 9/125* (2013.01); *F16H 57/0416* (2013.01)

(58) Field of Classification Search
CPC ............ F16H 55/563; F16H 61/66245; F16H 63/067; F16H 55/56; F16H 9/18; F16H 61/66227; F16H 9/125; F16H 57/0416
USPC ............................................. 474/14
See application file for complete search history.

(56) References Cited

U.S. PATENT DOCUMENTS

| | | | | |
|---|---|---|---|---|
| 3,733,918 A | * | 5/1973 | Domaas | F16H 55/563 474/14 |
| 3,759,111 A | * | 9/1973 | Hoff | F16H 55/563 474/14 |
| 3,861,229 A | * | 1/1975 | Domaas | F16H 55/563 474/14 |
| 3,916,707 A | * | 11/1975 | Wells | F16H 61/66245 474/46 |
| 3,939,720 A | * | 2/1976 | Aaen | F16H 55/563 474/46 |

(Continued)

*Primary Examiner* — Henry Y Liu
(74) *Attorney, Agent, or Firm* — Johnson and Phung

(57) ABSTRACT

An apparatus and methods are provided for a CVT primary clutch that provides enhanced adjustability and performance to off-road vehicle drivetrain. The clutch comprises a stationary sheave attached to a center post coupled to an output end of an engine crankshaft. A moveable sheave slides along the center post toward and away from the stationary sheave in response to engine RPM. A spider portion mounted onto the center post is coupled with the moveable sheave by multiple shift arms and ramps. The shift arms roll along the ramps to push the moveable sheave toward the stationary sheave in response to engine RPM. The weight of the shift arms and the angle of the ramps may be adjusted to affect the engine RPM at which the moveable sheave begins to move toward the stationary sheave. A face plate is fastened onto the moveable sheave for protecting internal components of the clutch.

18 Claims, 8 Drawing Sheets

(56) References Cited

U.S. PATENT DOCUMENTS

| | | | | |
|---|---|---|---|---|
| 3,951,224 A | * | 4/1976 | Beaudoin | B60K 11/06 474/93 |
| 3,958,461 A | * | 5/1976 | Aaen | F16H 55/563 474/14 |
| 3,961,539 A | * | 6/1976 | Tremblay | F16H 55/563 474/46 |
| 3,986,406 A | * | 10/1976 | Prasad | F16H 61/66245 474/14 |
| 4,027,544 A | * | 6/1977 | Kobayashi | F16H 55/563 474/14 |
| 4,051,739 A | * | 10/1977 | Takagi | F16H 55/563 474/14 |
| 4,052,908 A | * | 10/1977 | Takagi | F16H 55/563 474/14 |
| 4,095,479 A | * | 6/1978 | Lundberg | F16H 55/563 474/14 |
| 4,313,728 A | * | 2/1982 | Prasad | F16H 55/563 192/105 CD |
| 4,464,144 A | * | 8/1984 | Kobayashi | F16H 55/563 474/43 |
| 4,575,363 A | * | 3/1986 | Burgess | F16H 55/563 474/14 |
| 4,826,467 A | * | 5/1989 | Reese | F16H 55/563 474/14 |
| 5,209,703 A | * | 5/1993 | Mastine | F16H 55/563 474/70 |
| 5,326,330 A | * | 7/1994 | Bostelmann | F16H 55/563 474/14 |
| 5,562,555 A | * | 10/1996 | Peterson | F16H 55/563 192/105 CD |
| 5,597,060 A | * | 1/1997 | Huddleston | F16H 55/563 474/14 |
| 5,647,810 A | * | 7/1997 | Huddleston | F16H 55/563 384/126 |
| 5,692,983 A | * | 12/1997 | Bostelmann | F16H 55/563 474/14 |
| 5,797,816 A | * | 8/1998 | Bostelmann | F16H 55/563 474/14 |
| 6,149,540 A | * | 11/2000 | Johnson | F16H 61/66227 474/46 |
| 6,309,317 B1 | * | 10/2001 | Joss | F16D 43/06 474/14 |
| 6,334,826 B1 | * | 1/2002 | Takagi | F16H 55/563 474/14 |
| 6,346,056 B1 | * | 2/2002 | Nouis | F16H 61/66272 474/14 |
| 8,409,039 B2 | * | 4/2013 | Beyer | F16H 55/563 474/14 |
| 9,057,432 B1 | * | 6/2015 | Bouffard | F16H 55/56 |
| 9,593,759 B2 | * | 3/2017 | Millard | F16H 55/563 |
| 10,066,729 B2 | * | 9/2018 | Aitcin | B62M 27/02 |
| 10,174,827 B2 | * | 1/2019 | Eck | F16C 21/005 |
| 10,487,930 B2 | * | 11/2019 | Okeson | F16H 37/0846 |
| 11,624,427 B2 | * | 4/2023 | Itoo | F16H 9/125 474/14 |
| 11,680,635 B2 | * | 6/2023 | Olason | F16H 63/067 474/14 |
| 11,739,836 B2 | * | 8/2023 | Roberts | F16H 55/563 474/14 |
| 11,835,120 B2 | * | 12/2023 | Hamm | F16H 55/563 |
| 2002/0119846 A1 | * | 8/2002 | Kitai | F16H 63/062 474/14 |
| 2002/0123400 A1 | * | 9/2002 | Younggren | F16H 63/067 474/14 |
| 2004/0110583 A1 | * | 6/2004 | Liang | F16H 55/563 474/14 |
| 2009/0227404 A1 | * | 9/2009 | Beyer | F16H 55/563 474/14 |
| 2011/0092325 A1 | * | 4/2011 | Vuksa | F16H 9/18 192/45.02 |
| 2012/0214626 A1 | * | 8/2012 | Cook | F16H 55/563 474/14 |
| 2014/0349792 A1 | * | 11/2014 | Aitcin | F16H 63/067 474/13 |
| 2015/0267792 A1 | * | 9/2015 | Hochmayr | F16H 9/125 474/14 |
| 2016/0160989 A1 | * | 6/2016 | Millard | F16H 55/563 474/14 |
| 2017/0030454 A1 | * | 2/2017 | Aitcin | F16H 55/36 |
| 2018/0238430 A1 | * | 8/2018 | Eck | F16H 55/563 |
| 2018/0363748 A1 | * | 12/2018 | Okeson | F16H 61/66245 |

* cited by examiner

CVT PRIMARY CLUTCH FOR OFF-ROAD VEHICLES

PRIORITY

This application claims the benefit of and priority to U.S. Provisional Application, entitled "CVT Primary Clutch For Off-Road Vehicles," filed on Mar. 8, 2021 and having application Ser. No. 63/158,307, the entirety of said application being incorporated herein by reference.

FIELD

Embodiments of the present disclosure generally relate to the field of off-road vehicle drivetrains. More specifically, embodiments of the disclosure relate to an apparatus and methods for a CVT primary clutch that provides enhanced adjustability and performance to off-road vehicle drivetrains.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

Many recreational off-road vehicles, such as all-terrain vehicles (ATV's), utility vehicles, motorcycles, snowmobiles, and the like, include a continuously variable transmission (CVT). In general, a CVT is an automatic transmission that can change seamlessly through a continuous range of gear ratios, unlike conventional transmissions that provide a limited number of gear ratios in fixed steps.

One of the most common types of CVT includes a V-belt connected between two variable diameter pulleys. Each variable diameter pulleys includes two cone-shaped halves, or sheaves, that can be moved together and apart. Moving the two sheaves of a pulley closer together causes the V-belt to ride higher, or farther away from an axle of the pulley. As such, an effective diameter of the pulley is dependent on the distance between the two sheaves of the pulley. Further, by moving the sheaves of a first pulley closer together and the sheaves of a second pulley farther apart, the V-belt can be caused to ride higher on the first pulley and ride lower on the second pulley. Thus, a gear ratio between the first and second pulleys can be manipulated by adjusting the distance between the sheaves comprising the first and second pulleys.

Moreover, since the distance between the first and second pulleys as well as the length of the V-belt remain constant, the first and second pulleys must be adjusted simultaneously to maintain a suitable tension on the V-belt. In some cases, a simple CVT may include a centrifugal drive pulley and a spring-loaded driven pulley that uses belt tension to effect conforming adjustments in the driven pulley.

Given the popularity of off-road vehicles, there is a desire to improve the mechanical strength and performance of off-road drivetrain and suspension systems, while at the same reducing the mechanical complexity of such systems.

SUMMARY

An apparatus and methods are provided for a CVT primary clutch that provides enhanced adjustability and performance to off-road vehicle drivetrains. The clutch comprises a stationary sheave attached to a center post coupled to an output end of an engine crankshaft. A moveable sheave moves axially along the center post toward and away from the stationary sheave in response to engine RPM. A spider portion is mounted onto the center post within an interior of the moveable sheave and is coupled with the moveable sheave by way of multiple shift arms and ramps. The shift arms are configured to roll along the ramps to push the moveable sheave toward the stationary sheave in response to engine RPM. The weight of the shift arms and the angle of the ramps may be adjusted to affect the engine RPM at which the moveable sheave begins to move toward the stationary sheave. A face plate is fastened onto the moveable sheave for protecting internal components of the clutch. The face plate includes multiple openings to provide easy access to the internal components for adjusting the clutch.

In an exemplary embodiment, a CVT primary clutch for an engine of a vehicle comprises: a center post for mounting to an output end of an engine crankshaft; a stationary sheave to be attached to the center post; a moveable sheave for moving axially along the center post toward and away from the stationary sheave in response to engine RPM; and a face plate to be fastened onto the moveable sheave for protecting internal components of the clutch.

In another exemplary embodiment, the face plate may be implemented with any of various decorations, colors, diagrams, words, numbers, and the like. In another exemplary embodiment, the face plate includes multiple openings configured to provide easy access to internal components comprising the clutch. In another exemplary embodiment, the openings facilitate quickly and easily performing adjustments to the performance of the clutch. In another exemplary embodiment, multiple fan blades may be disposed on an inner surface of the face plate and configured to provide cooling to the components comprising the clutch.

In another exemplary embodiment, a roller bearing may be mounted onto the center post and disposed between the stationary sheave and the moveable sheave. In another exemplary embodiment, the roller bearing is configured to provide a stationary surface for a belt to reside on during engine idling. In another exemplary embodiment, the roller bearing reduces belt friction and overall clutch temperature while increasing longevity of the belt.

In another exemplary embodiment, a spider portion is configured to be mounted onto the center post within an interior of the moveable sheave. In another exemplary embodiment, a coil spring is configured to be disposed between the spider portion and the face plate to bias the moveable sheave away from the stationary sheave. In another exemplary embodiment, multiple shift arms and ramps couple the moveable sheave with the spider portion. In another exemplary embodiment, the multiple shift arms each includes a roller configured to ride on a ramp that is coupled to the moveable sheave. In another exemplary embodiment, the roller is configured push against the ramp when centrifugal force causes the multiple shift arm to be pushed away from the center post. In another exemplary embodiment, the multiple shift arms and the rollers and the ramps are configured to push the moveable sheave toward the stationary sheave in response to engine RPM.

In another exemplary embodiment, the ramps are each supported in the moveable sheave by way of a quick shift bolt. In another exemplary embodiment, the quick shift bolt is configured to provide an adjustable means for positioning the ramp with respect to the moveable sheave. In another exemplary embodiment, the ramps each comprise a first side and a second side that may be selected to contact the rollers and affect the engine RPM at which the moveable sheave begins to move toward the stationary sheave. In another exemplary embodiment, the multiple shift arms are each configured to receive additional weights to affect the engine RPM at which the moveable sheave begins to move toward the stationary sheave. In another exemplary embodiment, the additional weights include any of washer weights, bolt pairs, and roller weights.

In another exemplary embodiment, the center post comprises a generally elongate member that includes a first smooth portion configured to support the face plate when the moveable sheave and the face plate slide toward and away from the stationary sheave. In another exemplary embodiment, the center post includes a first threaded portion configured to receive a ring nut to fixate the spider portion to the center post. In another exemplary embodiment, a second threaded portion comprising the center post is configured to facilitate coupling the stationary sheave to the center post.

In another exemplary embodiment, the center post includes a ring boss configured to lock with the stationary sheave and provide improved support to the stationary sheave. In another exemplary embodiment, the center post includes a second smooth portion configured to support a roller bearing configured to provide a stationary surface for a belt to reside on during engine idling.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
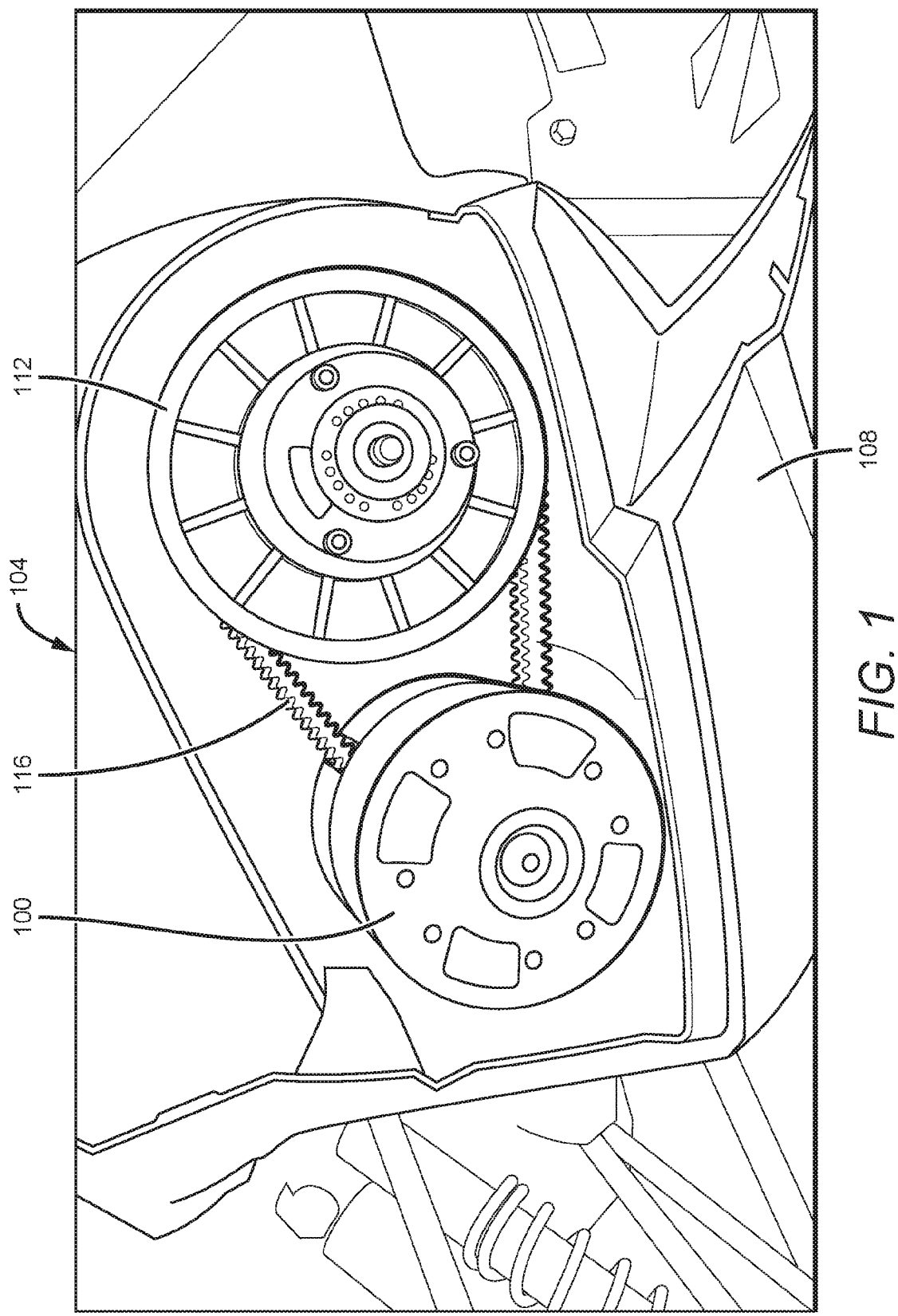
FIG. 1 illustrates an exemplary embodiment of a CVT primary clutch comprising a portion of a CVT of an exemplary vehicle, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first sheave," may be made. However, the specific numeric reference should not be interpreted as a literal sequential order but rather interpreted that the "first sheave" is different than a "second sheave." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Many recreational off-road vehicles, such as all-terrain vehicles (ATV's), include a continuously variable transmission (CVT). One common type of CVT includes a V-belt connected between two variable diameter pulleys. A gear ratio between the two pulleys can be manipulated by adjusting the separation between two sheaves comprising each of the pulleys. Since the distance between the two pulleys as well as the length of the V-belt remain constant, the two pulleys must be adjusted simultaneously to maintain a suitable tension on the V-belt. Embodiments disclosed herein provide an apparatus and methods for a CVT primary clutch that provides enhanced adjustability and performance to off-road vehicle drivetrains.

FIG. 1 illustrates an exemplary embodiment of a CVT primary clutch 100 comprising a portion of a CVT 104 of an exemplary vehicle 108. The CVT primary clutch 100 is attached to an engine of the vehicle 108 and joined to a CVT secondary clutch 112 by way of a belt 116. The belt 116 may of a V-belt variety or any other variety of belt that is suitable for use in the CVT 104. The CVT secondary clutch 112 is attached to a transmission, transaxle, or drivetrain of the vehicle 108. When the engine applies a suitable torque, the CVT primary clutch 100 turns the CVT secondary clutch 112 by way of the belt 116, as described herein.

The CVT primary clutch 100 (hereinafter "clutch 100") may be of a centrifugal clutch variety that is mounted to an output end of an engine crankshaft. The clutch 100 generally includes a fixed, stationary sheave and a moveable sheave that can be moved toward the stationary sheave to engage the belt 116. When engine speed increases, the clutch 100 pushes the moveable sheave toward the stationary sheave, thus narrowing the spacing between the stationary sheave and the moveable sheave. The narrow spacing causes the belt 116 to rotate and turn the CVT secondary clutch 112 (hereinafter "secondary clutch 112"). While at idle speeds, however, the moveable sheave is moved away from the stationary sheave, thus allowing the belt 116 to sit between the stationary sheave and the moveable sheave without being driven. The spacing between the stationary sheave and the moveable sheave provides a "neutral" position that allows the engine to idle without transmitting power to the drivetrain of the vehicle 108.

Figure 2:
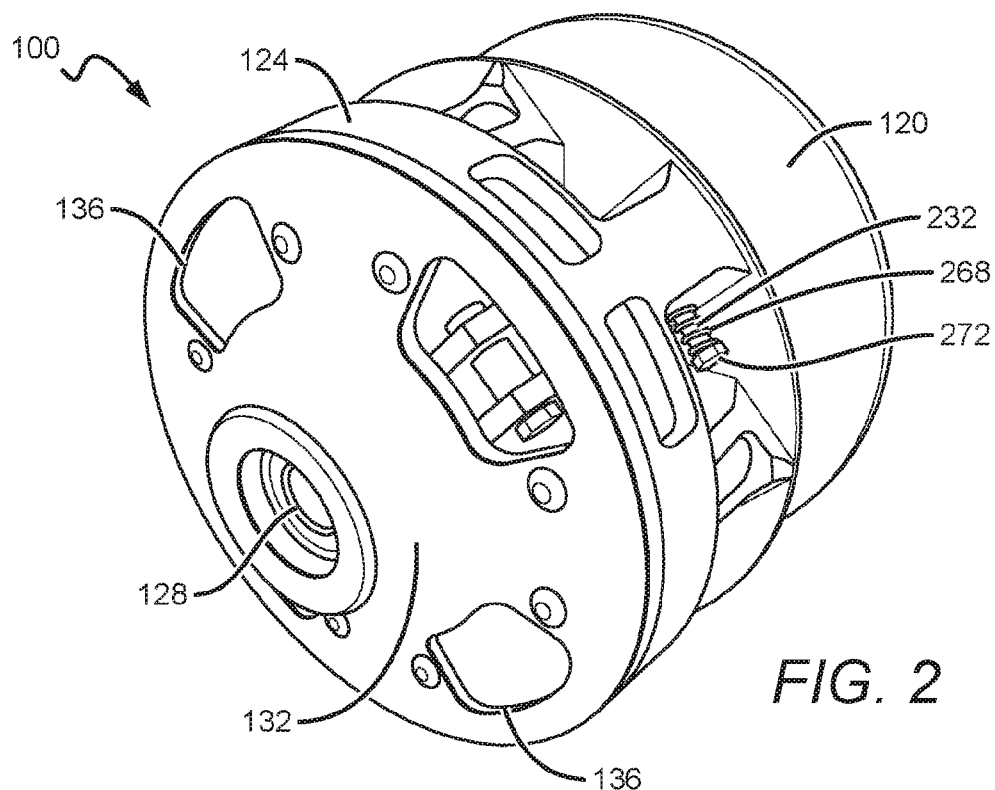
FIG. 2 illustrates a perspective view of an exemplary embodiment of a CVT primary clutch in accordance with the present disclosure.

FIG. 2 illustrates a perspective view of an exemplary embodiment of a primary clutch 100 in accordance with the present disclosure. The clutch 100 includes a stationary sheave 120 and a moveable sheave 124 that generally share a center post 128 that operates as an axle of the clutch 100. As mentioned above, the stationary sheave 120 is configured to mounted to an output end of an engine crankshaft. The stationary sheave 120 may be coupled to the engine crankshaft by way of the center post 128. The moveable sheave 124 is configured to move axially along the center post 128 toward and away from the stationary sheave 120 in response to engine RPM. A face plate 132 may be fastened onto the moveable sheave 124 to protect internal components as well as to add an aesthetic appeal to the clutch 100. The face plate 132 may be implemented with any of various decorations, colors, diagrams, words, numbers, and the like, without limitation. Further, as shown in FIG. 2, the face plate 132 includes multiple openings 136 configured to provide a practitioner with easy access to internal components comprising the clutch 100. The openings 136 facilitate the practitioner quickly and easily performing adjustments to the performance of the clutch 100, as described herein.

Figure 3:
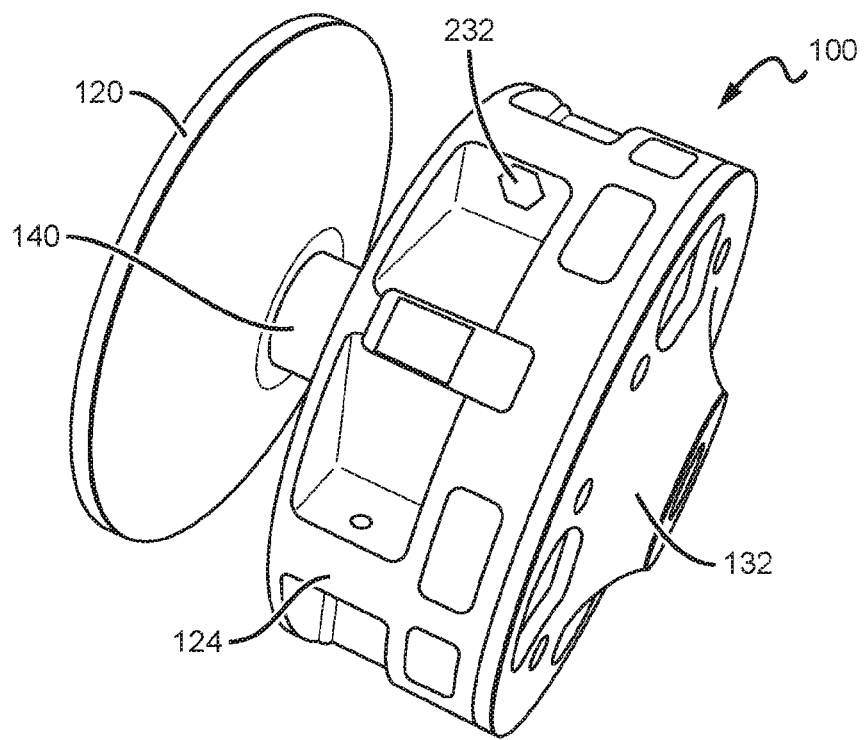
FIG. 3 illustrates an upper perspective view of the CVT primary clutch shown in FIG. 2.
Figure 5:
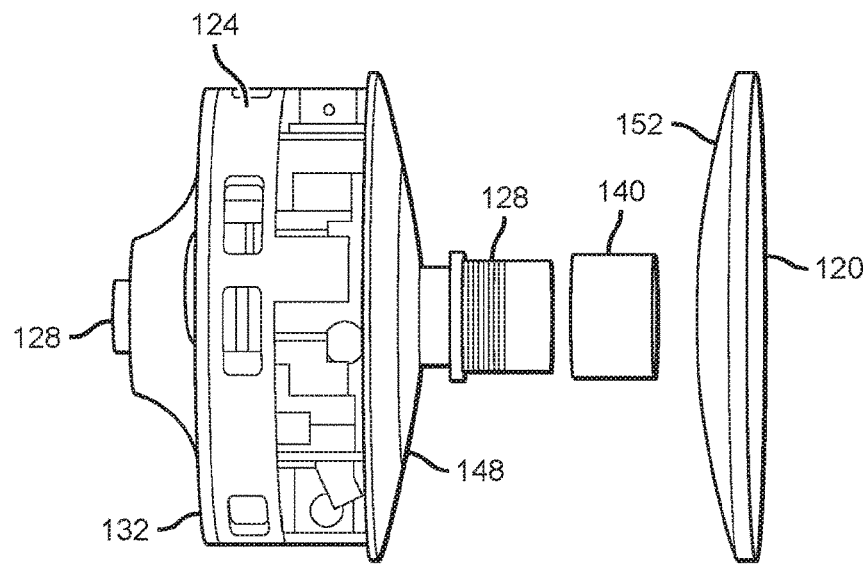
FIG. 5 illustrates an exploded view of an exemplary embodiment of a CVT primary clutch that includes a roller bearing mounted onto a center post of the CVT primary clutch.
Figure 6:
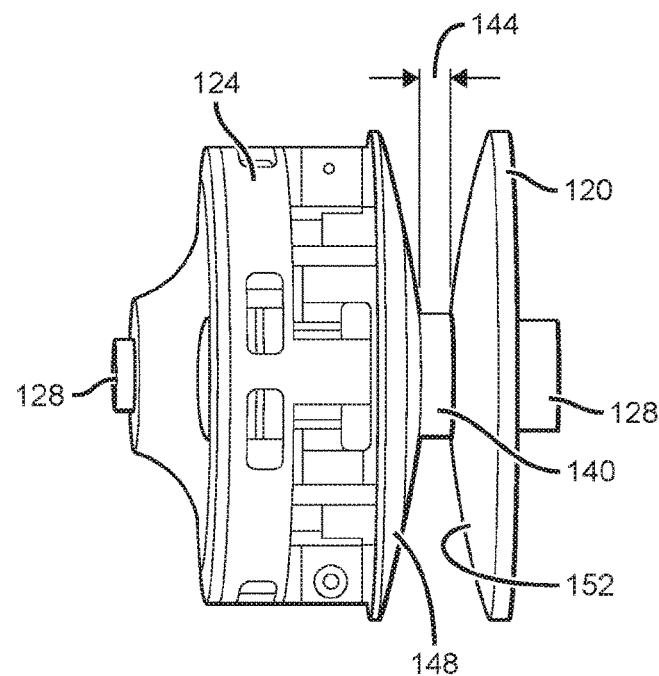
FIG. 6 illustrates a side view of an exemplary embodiment of a CVT primary clutch that includes a spacing between a curved surface of a moveable sheave and a curved surface of a stationary sheave, in accordance with the present disclosure.

FIG. 3 illustrates an upper perspective view of the clutch 100 shown in FIG. 2. As shown in FIG. 3, a roller bearing 140 may be disposed between the stationary sheave 120 and the moveable sheave 124. As shown in FIG. 5, the roller bearing 140 may be mounted onto the center post 128. The roller bearing 140 is configured to provide a stationary surface for the belt 116 to reside during engine idling. Experimental observations have demonstrated that the roller bearing 140 reduces belt 116 friction and overall clutch 100 temperature while increasing longevity of the belt 116. As engine RPM increases, the moveable sheave 124 will move toward the stationary sheave 120 causing a spacing 144 to narrow between a curved surface 148 of the moveable sheave 124 and a curved surface 152 of the stationary sheave 120, as shown in FIG. 6. Once the spacing 144 becomes sufficiently narrowed, the sheaves 120, 124 engage the belt 116, causing the belt 116 to ride on the curved surfaces 148, 152 and be driven by the sheaves 120, 124. The curvature of the curved surface 148 preferably matches the curvature of the curved surface 152. Direct observation has demonstrated that the matching curved surfaces 148, 152 optimize contact with the belt 116 as belt tension increases and the belt 116 begins to flex.

Figure 4:
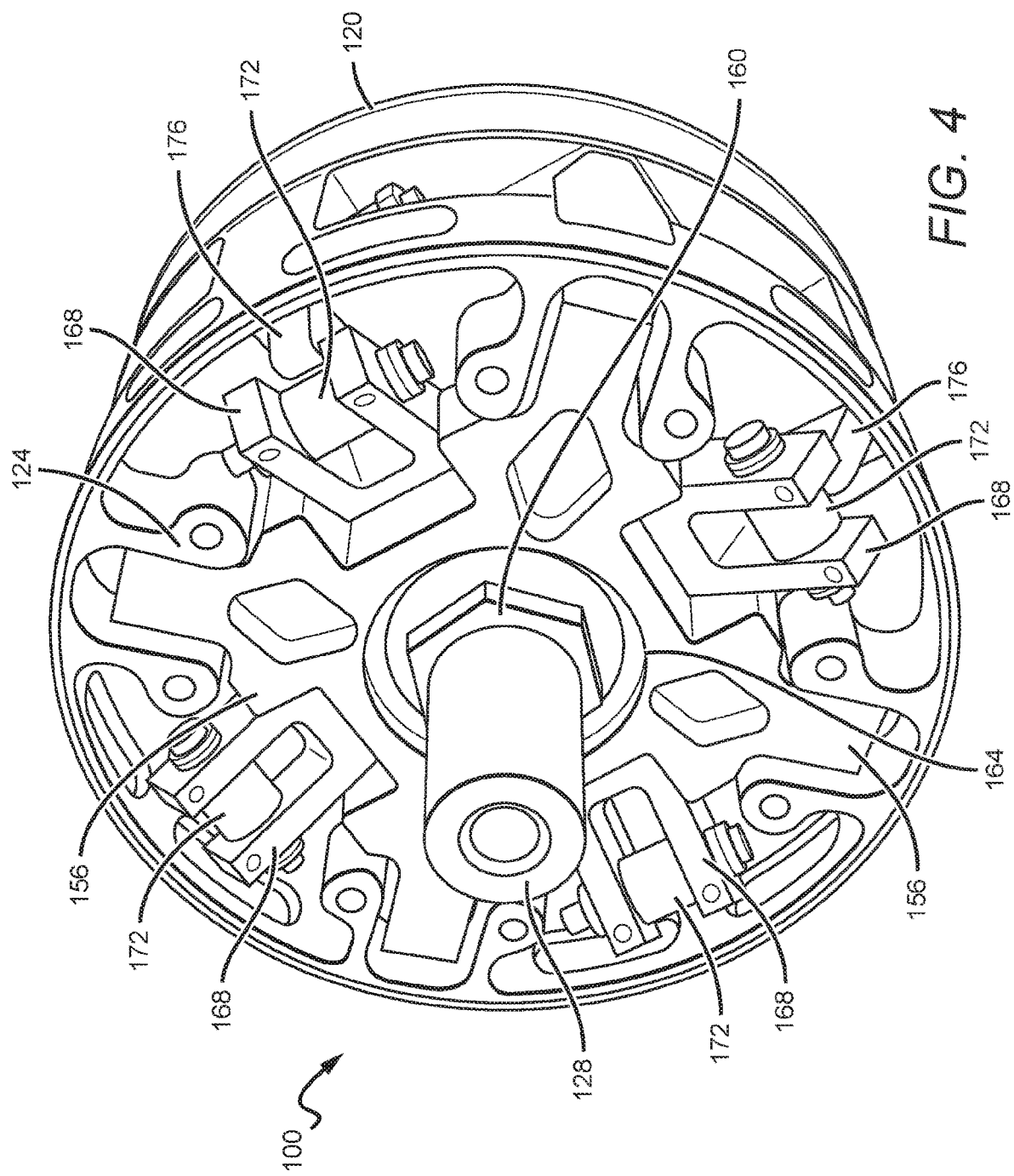
FIG. 4 illustrates a perspective view of the CVT primary clutch of FIG. 3 with a face plate removed to reveal internal components of the CVT primary clutch.

FIG. 4 illustrates a perspective view of the primary clutch 100 of FIG. 2 with the face plate 132 removed to reveal internal components comprising the clutch 100. As shown in FIG. 4, the clutch 100 includes a spider portion 156 mounted to the center post 128 by way of a ring nut 160. The spider portion 156 includes a circular groove 164 that surrounds the ring nut 160 and is configured to receive an end of a coil spring (not shown) that may be disposed between the spider portion 156 and an interior surface of the face plate 132. The coil spring serves to bias the moveable sheave 124 away from the stationary sheave 120, as described herein. The moveable sheave 124 is coupled with the spider portion 156 by way of multiple shift arms 168. Each shift arm 168 includes a roller 172 configured to ride on a ramp 176 that is coupled to the moveable sheave 124. It is contemplated that the ramps 176 may comprise chromoly steel that is coated with zinc to prevent rust and provide lubricative properties to the clutch 100.

During operation, while the clutch 100 rotates, centrifugal force causes the shift arms 168 to be pushed radially outward away from the center post 128, causing the rollers 172 to push against the ramps 176. As the rate of rotation increases, the rollers 172 push on the ramps 176 with enough force to push the moveable sheave 124 toward the stationary sheave 120, as described herein. Unlike conventional clutches wherein moveable ramps engage with stationary rollers, in the present clutch 100 the rollers 172 move while the ramps 176 remain stationary with respect to the moveable sheave 124. As such, the clutch 100 includes fewer moving parts and less internal friction than conventional clutches.

Figure 7:
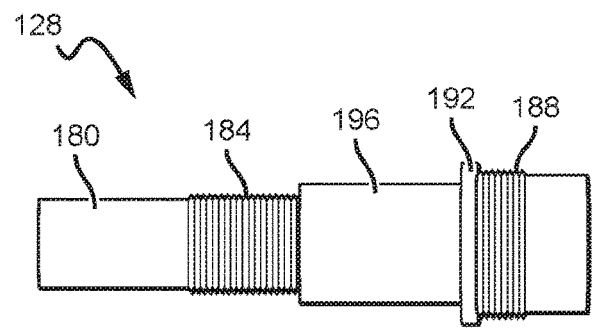
FIG. 7 illustrates a side view of an exemplary embodiment of a center post that may be incorporated into a CVT primary clutch in accordance with the present disclosure.

Turning, now, to FIG. 7, an exemplary embodiment of the center post 128 is shown. The center post 128 may be made of a suitably strong material, such as chromoly streel. Preferably, the material comprising the center post 128 has a relatively high density so as to concentrate the weight of the clutch 100 closer to the center of the clutch 100. It is contemplated that centralizing the weight creates a lower rotational inertia of the clutch 100 that allows the clutch 100 to react relatively quickly to engine speed changes, and thus results in an improved throttle response as well as a more predictable acceleration.

As shown in FIG. 7, the center post 128 is a generally elongate member that includes a first smooth portion 180 configured to support the face plate 132 when the moveable sheave 124 and the face plate 132 slide toward and away from the stationary sheave 120. Further, the center post 128 includes a first threaded portion 184 configured to receive the ring nut 160 to fixate the spider portion 156 to the center post 128. A second threaded portion 188 is configured to facilitate coupling the stationary sheave 120 to the center post 128. The center post 128 includes a ring boss 192 configured to lock with the stationary sheave 120 and provide improved support to the stationary sheave 120. The center post 128 includes a second smooth portion 196 configured to support the roller bearing 140, as described herein.

Figure 8:
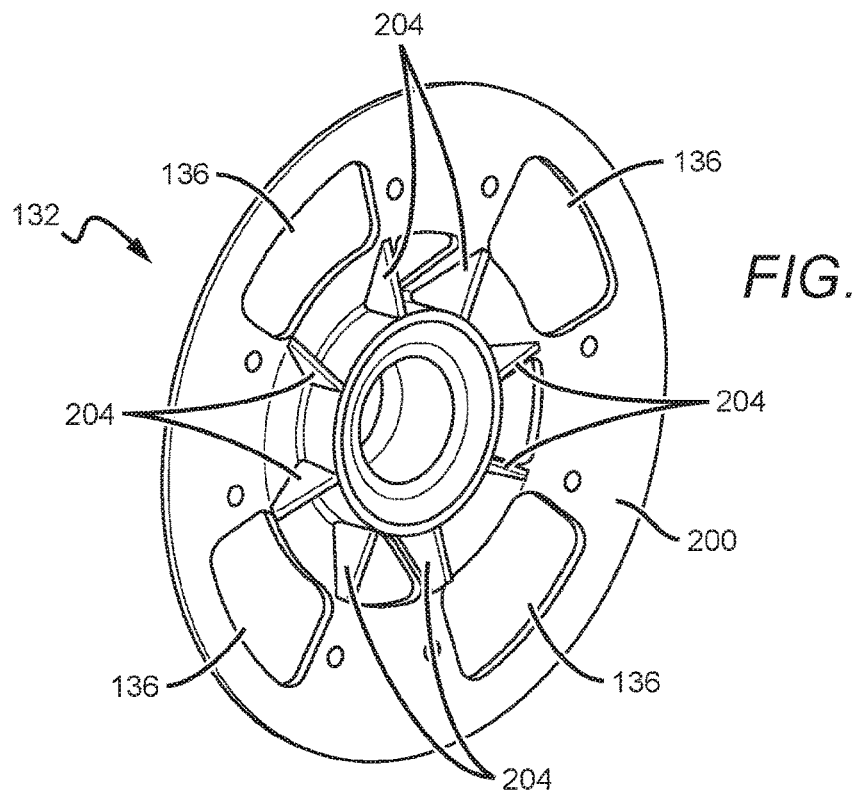
FIG. 8 illustrates an inner surface of an exemplary embodiment of a face plate that may be fastened onto a moveable sheave of a CVT primary clutch.

FIG. 8 illustrates an inner surface 200 of an exemplary embodiment of a face plate 132 that may be fastened onto the moveable sheave 124 to protect internal components as well as to add an aesthetic appeal to the clutch 100. As mentioned hereinabove, the face plate 132 may be implemented with any of various decorations, colors, diagrams, words, numbers, and the like, without limitation. Further, the face plate 132 includes multiple openings 136 to provide easy access to internal components of the clutch 100. The openings 136 facilitate the practitioner quickly and easily performing adjustments to the performance of the clutch 100, as described herein. As shown in FIG. 8, multiple fan blades 204 may be disposed on the inner surface 200 and configured to provide cooling to the components comprising the clutch 100.

Figure 9:
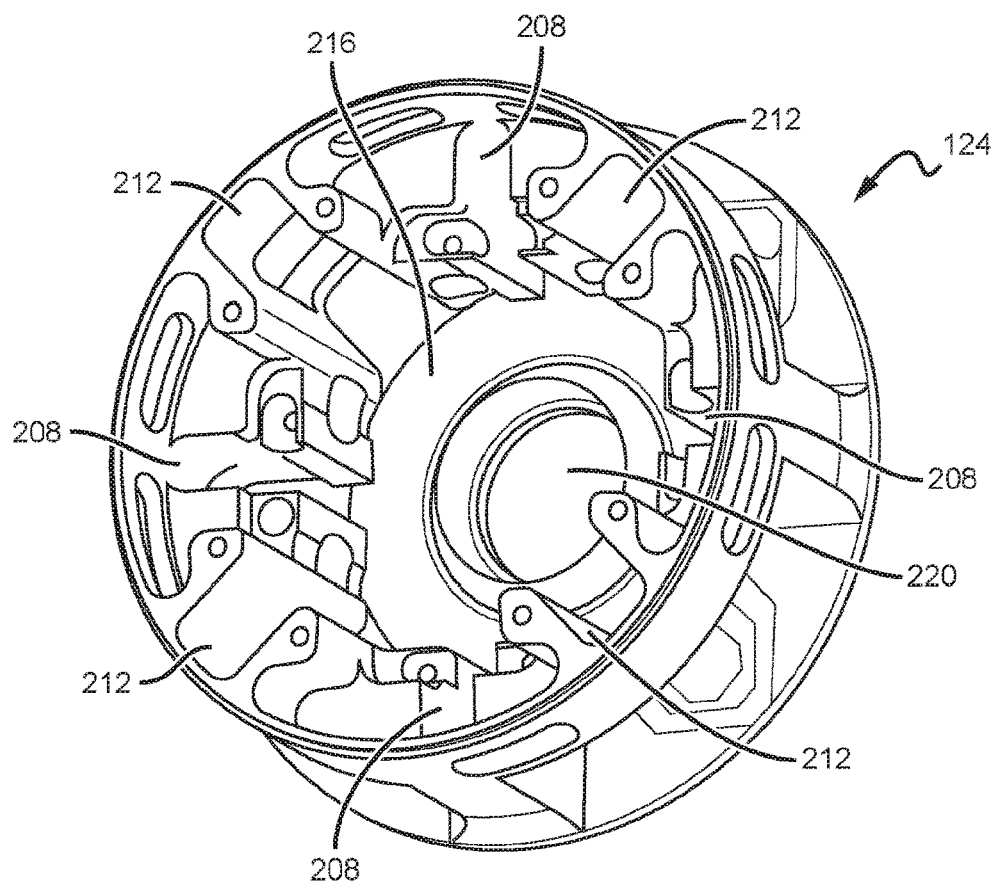
FIG. 9 illustrates an interior of an exemplary embodiment of a moveable sheave that may be incorporated into a CVT primary clutch in accordance with the present disclosure.

FIG. 9 illustrates an interior of an exemplary embodiment of a moveable sheave 124 that may be incorporated into the primary clutch 100 in accordance with the present disclosure. The moveable sheave 124 generally is configured to maximize structural integrity and heat dissipation. In the embodiment shown in FIG. 9, the moveable sheave 124 includes recesses 208 that are configured to receive the ramps 176. The recesses 208 are disposed in pairs on opposite sides of the moveable sheave 124 so as to balance the clutch 100 during operation. Further, the moveable sheave 124 includes recesses 212 disposed in pairs on opposite sides of an interior space 216 of the moveable sheave 124. The recesses 212 and the interior space 216 are configured to accommodate the spider portion 156 described hereinabove. A center bore 220 comprising the moveable sheave 124 is configured to receive the second smooth portion 196 of the center post 128, as described with respect to FIG. 7. In some embodiments, the center bore 220 may be configured to accommodate the roller bearing 140 installed onto the second smooth portion 196 of the center post 128, as described with respect to FIGS. 5-7.

Figure 10:
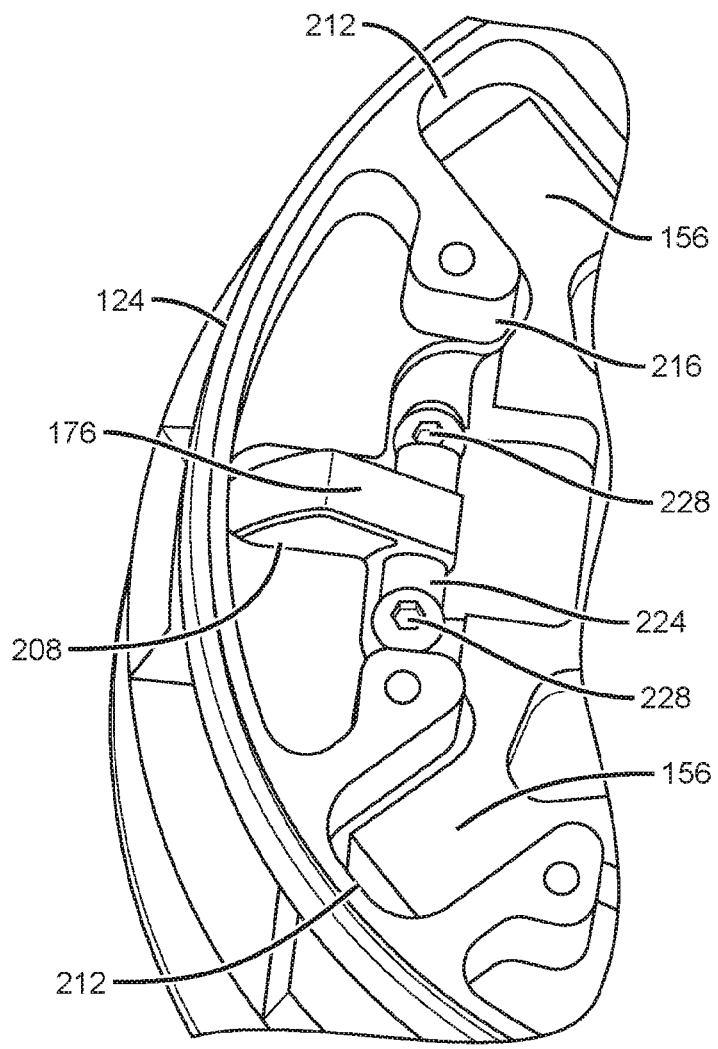
FIG. 10 illustrates a close-up view of the moveable sheave of FIG. 9 coupled with a spider portion and a ramp comprising a CVT primary clutch.

FIG. 10 illustrates a close-up view of the moveable sheave 124 of FIG. 9 coupled with a spider portion 156 and a ramp 176. As shown in FIG. 10, the spider portion 156 is slidably retained within the interior space 216 and recesses 212 of the moveable sheave 124. The ramp 176 is disposed within the recess 208 and coupled to the moveable sheave 124 by way of a pivot 224 and fasteners 228. The pivot 224 is configured to allow the ramp 176 to be rotated with respect to the recess 208. Free rotation of the ramp 176 is prevented by a quick shift bolt 232 (see FIGS. 12-14) that is mounted within the moveable sheave 124 below the ramp 176. As discussed in greater detail hereinbelow, the quick shift bolt 232 is configured to provide an adjustable means for positioning the ramp 176 with respect to the moveable sheave 124, whereby the practitioner may adjust the performance of the clutch 100, as desired.

Figure 11:
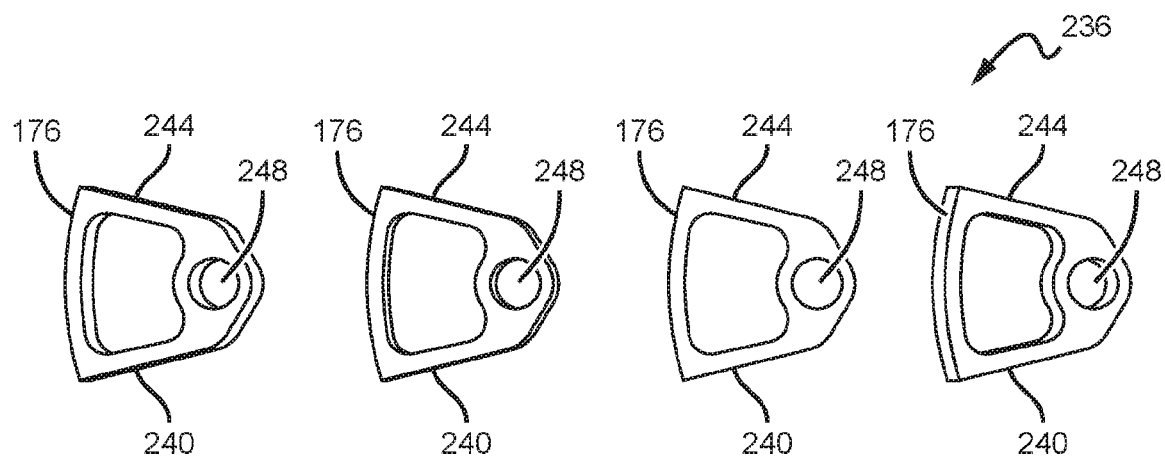
FIG. 11 illustrates an exemplary embodiment of a ramp set that may be incorporated into a CVT primary clutch according to the present disclosure.

FIG. 11 illustrates an exemplary embodiment of a ramp set 236 that may be incorporated into the clutch 100 according to the present disclosure. The ramp set 236 comprises an even number of similarly configured ramps 176. Preferably, the ramp set 236 comprises four substantially identical ramps 176 such that the clutch 100 remains balanced during rotation. As shown in FIG. 11, each of the ramps 176 includes a first side 240, which may be labeled "A," and a second side 244, which may be labeled "B," and an opening 248. The opening 248 is configured to receive the pivot 224 and allows the disposition, or angle, of the ramp 176 within the recess 208 to be adjusted. The first and second sides 240, 244 are configured to accept the rollers 172 of the shift arms 168, described with respect to FIG. 4. Thus, installing the ramp 176 in a position "A" places the first side 240 in a position to accept the roller 172, while installing the ramp 176 in a position "B" places the second side 244 in a position to accept the roller 172.

In general, the ramps 176 are adapted to enable the practitioner to select either the first side 240 or the second side 244 to contact the roller 172. The openings 136 in the face plate 132 (see FIG. 2) are configured to provide easy access to the ramps 176 without necessitating disassembly of the clutch 100. As such, the practitioner may work through the opening 136 to remove the fasteners 228 (see FIG. 10), flip the ramp 176 from position "A" to position "B," and then reinstall the fasteners 228. Flipping the ramps 176 from position "A" to position "B" increases belt 116 engagement and lowers the engine RPM at which the sheaves 120, 124 begin to drive the belt 116. The ramps 176 may be flipped in opposing pairs to maintain a balanced rotational inertia of the clutch 100. As such, the ramps 176 may be flipped according to three ramp profiles: all ramps 176 in position "A;" two ramps 176 in position "A" and two ramps 176 in position "B;" or all ramps 176 in position "B."

Figure 12:
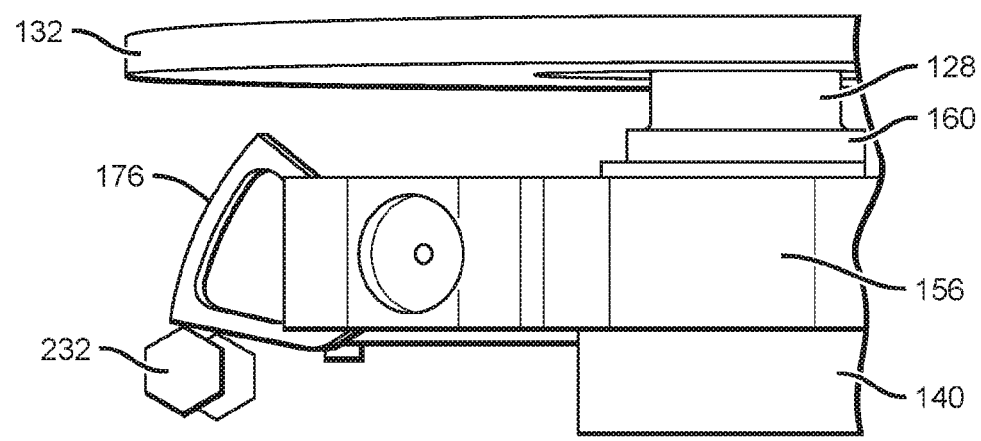
FIG. 12 illustrates a ghost view of a relationship between a ramp and a quick shift bolt in absence of a moveable sheave comprising a CVT primary clutch.
Figure 13:
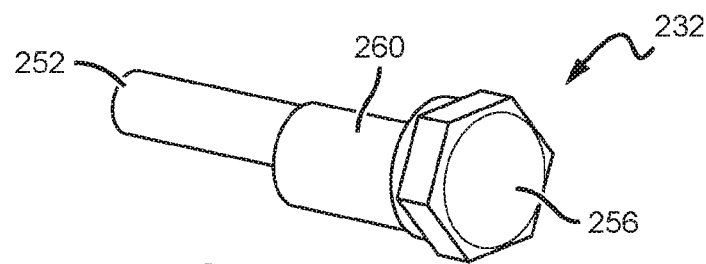
FIG. 13 illustrates an exemplary embodiment of a quick shift bolt that includes a threaded portion and a hexagonal head that share an intervening cam.
Figure 14:
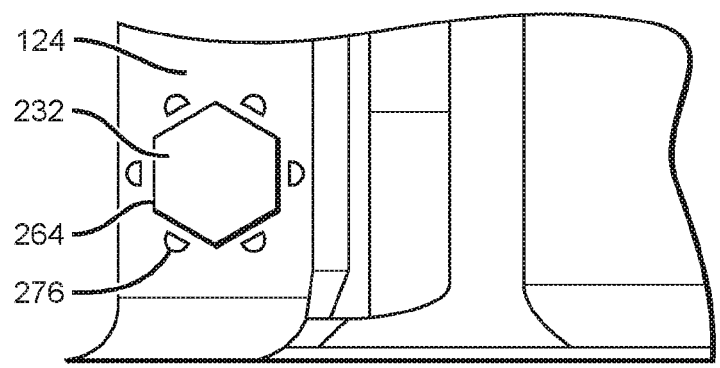
FIG. 14 illustrates a hexagonal head of the quick shift bolt of FIG. 13 locked within a hexagonal hole disposed in a moveable sheave, in accordance with the present disclosure.

FIG. 12 illustrates a relationship between a ramp 176 and a quick shift bolt 232 in absence of moveable sheave 124. The quick shift bolt 232 is configured to support the ramp 176 at a selected ramp angle with respect to the roller 172 (see FIG. 4). As best shown in FIG. 13, the quick shift bolt 232 includes a threaded portion 252 and a hexagonal head 256 that share an intervening cam 260. The hexagonal head 256 is configured to lock the quick shift bolt 232 within a hexagonal hole 264 disposed in the moveable sheave 124, as shown in FIG. 14. The threaded portion 252 is configured to receive a spring 268 and a nut 272, as shown in FIG. 2. As will be appreciated, the spring 268 biases the quick shift bolt 232 toward the moveable sheave 124 and thus keeps the hexagonal head 256 disposed in the hexagonal hole 264 as shown in FIG. 14.

The hexagonal hole 264 generally orients the quick shift bolt 232 in the moveable sheave 124 such that the cam 260 is in contact with the ramp 176, as shown in FIG. 12. As shown in FIG. 13, the cam 260 is offset from the longitudinal axis of the quick shift bolt 232, such that turning the quick shift bolt 232 causes the cam 260 to alter the ramp angle of the ramp 176 with respect to the roller 172 (see FIG. 4). As will be appreciated, the quick shift bolt 232 may be turned to six unique positions 276 (see FIG. 14) within the hexagonal hole 264 causing the ramp 176 to assume six unique ramp angles. Adjusting the quick shift bolt 232 to higher settings increases belt 116 engagement and lowers the engine RPM at which the sheaves 120, 124 begin to drive the belt 116. In the illustrated embodiment, the clutch 100 includes four quick shift bolts 232 that offer the following 21 different combinations of quick shift bolt 232 settings:

1:1 1:2 1:3 1:4 1:5 1:6

2:2 2:3 2:4 2:5 2:6

3:3 3:4 3:5 3:6

4:4 4:5 4:6

5:5 5:6

6:6

It should be understood that the four quick shift bolts 232 in combination with the above-discussed three ramp profiles provides 63 unique tuning options without requiring the practitioner to add additional weight to the clutch 100, unlike conventional clutches.

Figure 15:
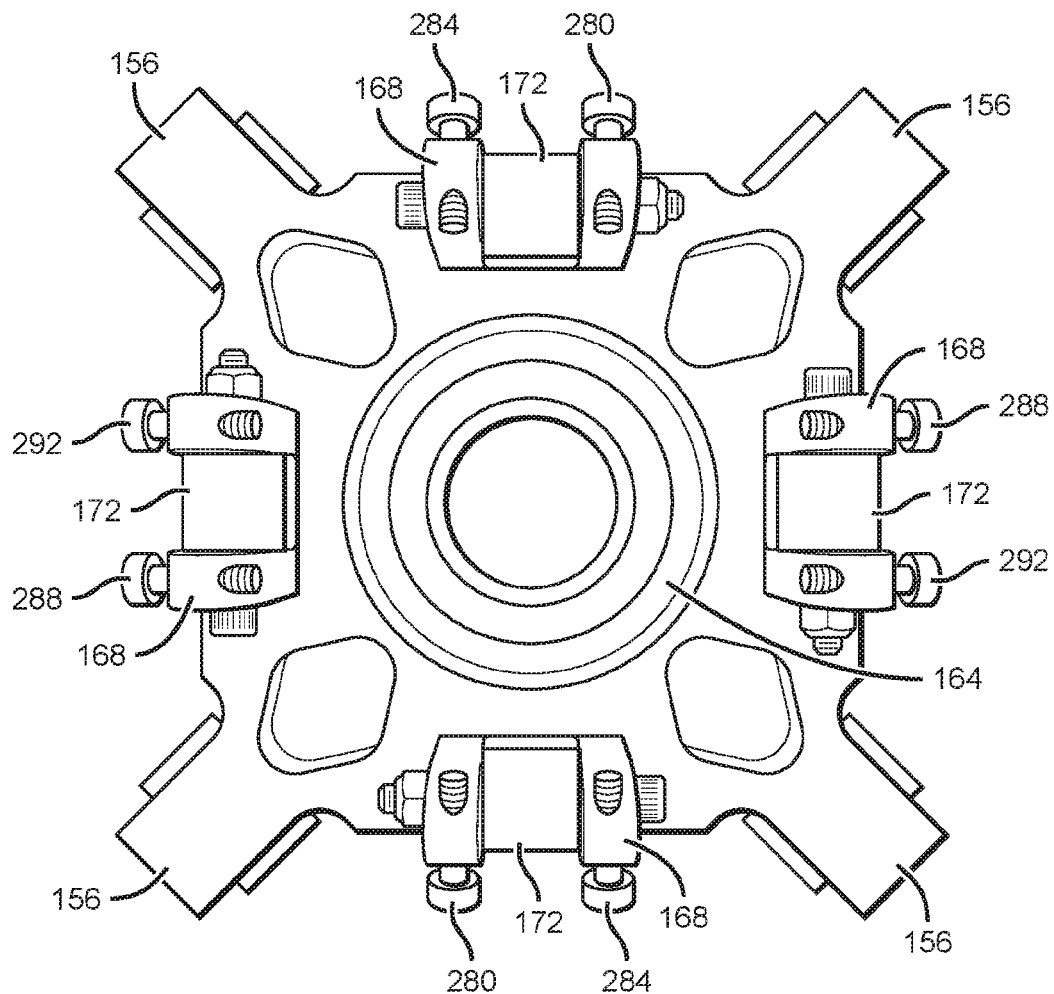
FIG. 15 illustrates an exemplary embodiment of a spider portion that includes shift arms and rollers that may be incorporated into a CVT primary clutch, according to the present disclosure.

In some embodiments, additional weight may be added to the clutch 100 to affect belt 116 engagement and the engine RPM at which the sheaves 120, 124 begin to drive the belt 116. For example, FIG. 15 illustrates an exemplary embodiment of a spider portion 156 that includes shift arms 168 and rollers 172 that may be incorporated into the clutch 100, according to the present disclosure. As shown in FIG. 15, additional weight in the form of bolts may be added to the shift arms 168 to decrease the engine RPM at which the clutch 100 begins to drive the belt 116. The additional weights must be added in opposing pairs to maintain a balanced rotational inertia of the clutch 100. For example, a first bolt pair 280 may be added to opposing shift arms 168 to achieve a first weight setting. A second weight setting may be obtained by adding a second bolt pair 284 to opposing shift arms 168 in addition to the first bolt pair 280. A third weight setting can be obtained by adding a third bolt pair 288 in addition to the first and second bolt pairs 280, 284. Further, adding a fourth bolt pair 292 to opposing shift arms 168 in addition to the previous bolt pairs 280, 284, 288 gives rise to a fourth weight setting. And, removing all the bolt pairs 280, 284, 288, 292 provides a fifth weight setting.

Figure 16:
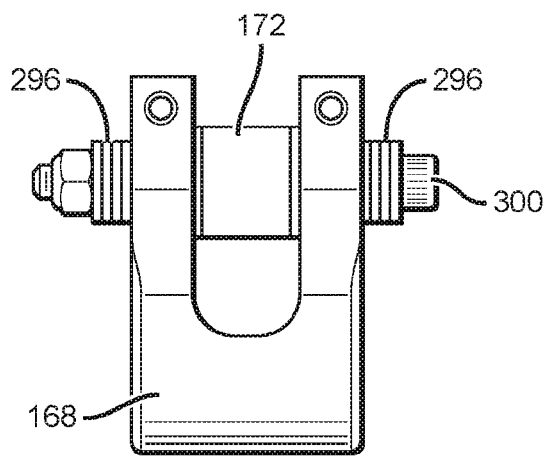
FIG. 16 illustrates an exemplary embodiment of a shift arm that includes multiple washer weights installed onto a thru bolt that supports a roller 172.
Figure 17:
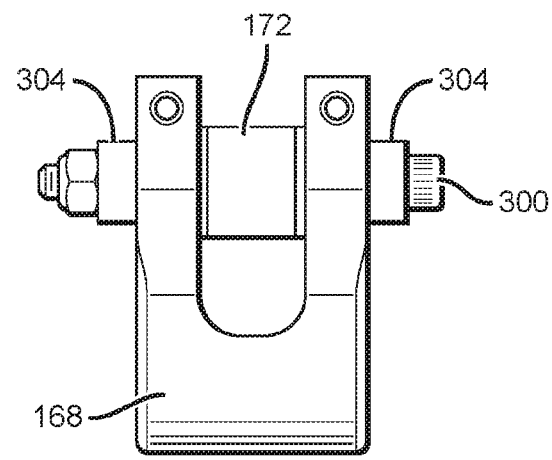
FIG. 17 illustrates an exemplary embodiment of a shift arm that includes roller weights installed onto a thru bolt that supports a roller.

In some embodiments, washer weights and roller weights may be added to the shift arms 168, as shown in FIGS. 16-17, to decrease the engine RPM at which the clutch 100 begins to drive the belt 116. FIG. 16 illustrates an exemplary embodiment of a shift arm 168 that includes multiple washer weights 296 installed onto a thru bolt 300 that supports a roller 172. In the illustrated embodiment, four washer weights 296 are mounted onto opposite sides of the shift arm 168. In some embodiments, however, more or less than four washer weights 296 may be added to the shift arm 168 so long as the washer weights 296 are added in pairs to opposing sides of the shift arms 168. FIG. 17 illustrates an exemplary embodiment of a shift arm 168 that includes roller weights 304 installed onto a thru bolt 300 that supports a roller 172. As will be appreciated, the roller weights 304 preferably are installed in a pair onto opposing sides of the shift arm 168.

Moreover, in some embodiments, performance of the clutch 100 may be adjusted by replacing the rollers 172 with different size rollers. For example, in one embodiment, the rollers 172 may include a standard size, a 1 mm oversize, and a 2 mm oversize. Experimental observations have demonstrated that oversized rollers 172 cause the moveable sheave 124 to move more quickly toward the stationary sheave 120, giving rise to a lower full shift RPM. It is contemplated that the quicker shifting of the clutch 100 is due to the weight of the oversize roller 172 as well as a greater angle between the shift arm 168 and the ramp 176 due to the diameter of the oversize roller 172. As with all of the above-mentioned adjustments, the oversize rollers 172 must be added in opposing pairs to maintain a balanced rotational inertia of the clutch 100.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A CVT primary clutch for an engine of a vehicle, the clutch comprising:
   a center post for mounting to an output end of an engine crankshaft;
   a stationary sheave to be attached to the center post;
   a moveable sheave for moving axially along the center post toward and away from the stationary sheave in response to engine RPM;
   a face plate to be fastened onto the moveable sheave for protecting internal components of the clutch;
   a spider portion mounted onto the center post within an interior of the moveable sheave; and
   at least two shift arms and ramps coupling the moveable sheave with the spider portion, the shift arms each including a roller configured to ride on the corresponding ramp coupled to the moveable sheave with the roller configured to push against the ramp when centrifugal force causes the multiple shift arm to be pushed away from the center post and the shift arms and the rollers and the ramps configured to push the moveable sheave toward the stationary sheave in response to engine RPM, the shift arms each including opposing exterior surfaces each configured to receive additional weights secured to the opposing exterior surfaces of the shift arm by a thru bolt to affect the engine RPM at which the moveable sheave begins to move toward the stationary sheave, the ramps each supported in the moveable sheave by a quick shift bolt directly mounted within the moveable sheave, the ramps each includes a roller engaging first side and a roller engaging second side located distal and opposite to the roller engaging first side, the first and second sides may be selected to contact the rollers and affect the engine RPM when the moveable sheave begins to move toward the stationary sheave.

2. The clutch of claim 1, wherein the face plate may be implemented with any of various decorations, colors, diagrams, words, numbers, and the like.

3. The clutch of claim 1, wherein the face plate includes multiple openings configured to provide easy access to internal components comprising the clutch.

4. The clutch of claim 3, wherein the openings facilitate quickly and easily performing adjustments to the performance of the clutch.

5. The clutch of claim 3, wherein multiple fan blades may be disposed on an inner surface of the face plate and configured to provide cooling to the components comprising the clutch.

6. The clutch of claim 1, wherein a roller bearing may be mounted onto the center post and disposed between the stationary sheave and the moveable sheave.

7. The clutch of claim 6, wherein the roller bearing is configured to provide a stationary surface for a belt to reside on during engine idling.

8. The clutch of claim 7, wherein the roller bearing reduces belt friction and overall clutch temperature while increasing longevity of the belt.

9. A CVT primary clutch for an engine of a vehicle, the clutch comprising:
- a center post for mounting to an output end of an engine crankshaft;
- a stationary sheave to be attached to the center post;
- a moveable sheave for moving axially along the center post toward and away from the stationary sheave in response to engine RPM;
- a face plate to be fastened onto the moveable sheave for protecting internal components of the clutch;
- a spider portion mounted onto the center post within an interior of the moveable sheave; and
- at least 4 shift arms and ramps coupling the moveable sheave with the spider portion, the multiple shift arms each including a roller configured to ride on the corresponding ramp that is coupled to the moveable sheave with the roller configured to push against the corresponding ramp when centrifugal force causes the multiple shift arm to be pushed away from the center post and the arms and the rollers and the ramps configured to push the moveable sheave toward the stationary sheave in response to engine RPM, the ramps each supported in the moveable sheave by a quick shift bolt directly mounted within the moveable sheave with the quick shift bolt configured to provide an adjustable means for positioning the ramp with respect to the moveable sheave, the ramps each includes a roller engaging first side and a roller engaging second side located distal and opposite to the roller engaging first side, the first and second sides may be selected to contact the rollers and affect the engine RPM when the moveable sheave begins to move toward the stationary sheave.

10. The clutch of claim 9, wherein a coil spring is configured to be disposed between the spider portion and the face plate to bias the moveable sheave away from the stationary sheave.

11. A CVT primary clutch for an engine of a vehicle, the clutch comprising:
- a center post for mounting to an output end of an engine crankshaft;
- a stationary sheave to be attached to the center post;
- a moveable sheave for moving axially along the center post toward and away from the stationary sheave in response to engine RPM;
- a face plate to be fastened onto the moveable sheave for protecting internal components of the clutch;
- a spider portion mounted onto the center post within an interior of the moveable sheave; and
- at least two shift arms and ramps coupling the moveable sheave with the spider portion, the shift arms each including a roller configured to ride on the corresponding ramp coupled to the moveable sheave with the roller configured to push against the ramp when centrifugal force causes the multiple shift arm to be pushed away from the center post and the shift arms and the rollers and the ramps configured to push the moveable sheave toward the stationary sheave in response to engine RPM, the ramps each supported in the moveable sheave by a quick shift bolt directly mounted within the moveable sheave, the ramps each includes a roller engaging first side and a roller engaging second side located distal and opposite to the roller engaging first side, the first and second sides may be selected to contact the rollers and affect the engine RPM when the moveable sheave begins to move toward the stationary sheave.

12. The clutch of claim 11, wherein the multiple shift arms each includes opposing exterior surfaces are each configured to receive additional weights secured to the opposing exterior surfaces of the shift arm by a thru bolt to affect the engine RPM at which the moveable sheave begins to move toward the stationary sheave.

13. The clutch of claim 12, wherein the additional weights include any of washer weights, bolt pairs, and roller weights.

14. The clutch of claim 9, wherein the center post comprises a generally elongate member that includes a first smooth portion configured to support the face plate when the moveable sheave and the face plate slide toward and away from the stationary sheave.

15. The clutch of claim 14, wherein the center post includes a first threaded portion configured to receive a ring nut to fixate the spider portion to the center post.

16. The clutch of claim 15, wherein a second threaded portion comprising the center post is configured to facilitate coupling the stationary sheave to the center post.

17. The clutch of claim 9, wherein the center post includes a ring boss configured to lock with the stationary sheave and provide improved support to the stationary sheave.

18. The clutch of claim 17, wherein the center post includes a second smooth portion configured to support a roller bearing configured to provide a stationary surface for a belt to reside on during engine idling.

* * * * *